United States Patent
Hadley

[15] 3,645,135
[45] Feb. 29, 1972

[54] MERCURY SYSTEM
[72] Inventor: Benjamin H. Hadley, Claremont, Calif.
[73] Assignee: Schwien Engineering, Inc., Pomona, Calif.
[22] Filed: Aug. 24, 1970
[21] Appl. No.: 66,224

[52] U.S. Cl. ................................73/398 C, 33/209, 73/401
[51] Int. Cl. ...........................................................G01l 9/12
[58] Field of Search ..................73/398 C, 406, 401; 33/209; 317/246, 249

[56] References Cited
UNITED STATES PATENTS 2,532,883  12/1950  Bennett et al............................33/209
3,296,867  1/1967  Schwien................................73/398 C Primary Examiner—Donald O. Woodiel
Attorney—Harris, Kiech, Russell and Kern

[57] ABSTRACT

A mercury system for use as a level and as a manometer. A pair of cisterns with interconnected pools of mercury and with a float in each cistern serving as the lower plate of the cistern capacitor. A resilient sheet attached to the float and to the cistern for sealing the mercury in a lower chamber of the cistern. An alternative diaphragm consisting of a thin resilient sheet closing the mercury pool with the surface of the pool serving as a capacitor plate. A bellows unit connected in the mercury line between the cisterns for controlling the mercury level in the cisterns.

14 Claims, 6 Drawing Figures

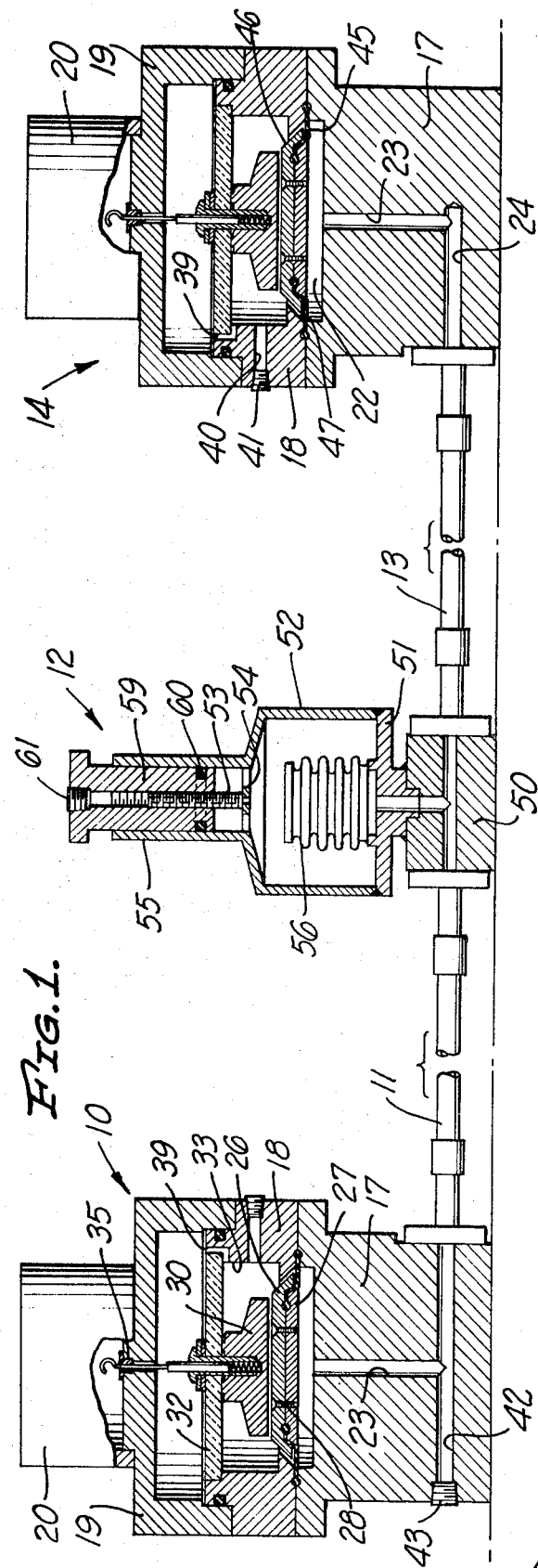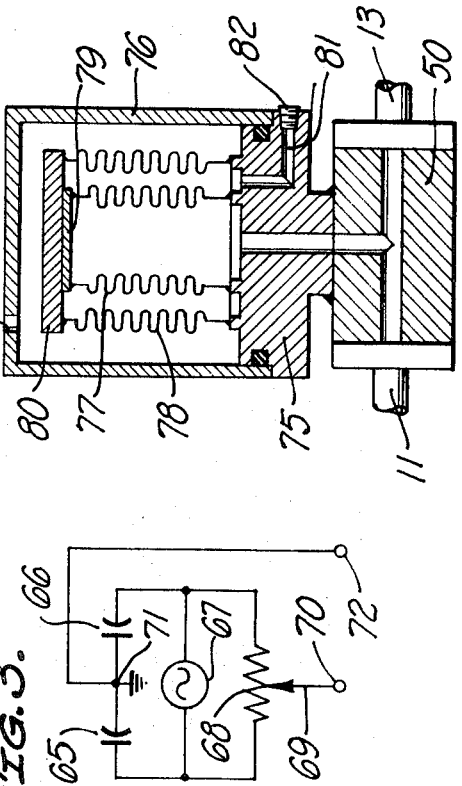

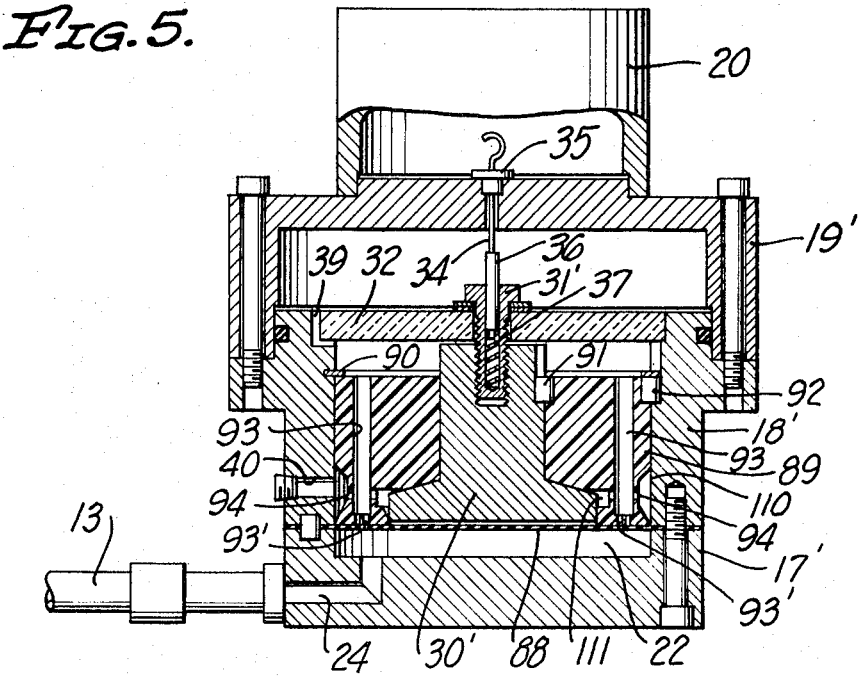
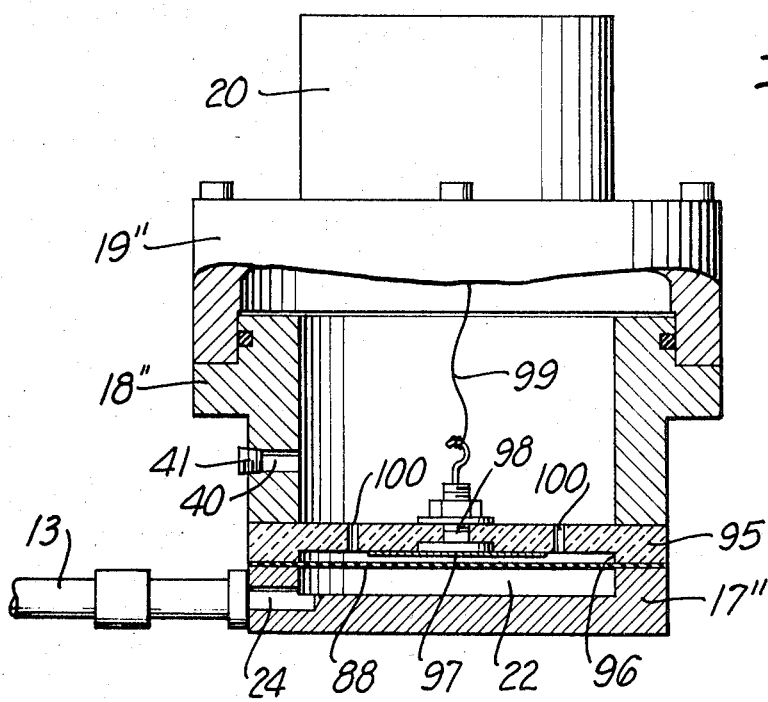

MERCURY SYSTEM

This invention relates to mercury systems suitable for use in high accuracy levels and manometers. A typical system includes a pair of cisterns with interconnected pools of mercury. Each cistern includes a fixed upper capacitor plate, with the mercury pool serving as the lower capacitor plate, providing a pair of variable capacitors which are used to provide an electrical outlet indicative of the pressure difference above the pools or of the difference in elevation of the cisterns. Typical instruments of this type are illustrated in U.S. Pat. Nos. 3,225,599 and 3,296,867.

A number of problems are encountered in the conventional instruments. The sensitivity of the instrument is a function of the capacitor plate spacing which in turn is a function of the amount of mercury in the system and many difficulties are encountered in charging the system with the exact amount of mercury. Spillage or overflow of mercury occurs occasionally and a considerable amount of time and labor must be expended in cleaning up the instrument before it can be placed in service again. Spilling or overflow may occur when a cistern is moved rapidly or slewed or when an instrument is tilted or when there is a sharp change in pressure, which might occur when a hose is accidentally disconnected or a valve is actuated at the wrong time. Some existing instruments utilize additional valving for controlling mercury flow during slewing operation but this ordinarily adds complications which increase the cost and decrease the reliability.

It is an object of the present invention to provide a new and improved mercury system incorporating means for controlling the mercury level in the cisterns. A specific object is to provide a bellows unit for connecting in the mercury line with means for varying the volume of the bellows manually and automatically as desired.

It is another object of the invention to provide a new and improved mercury system incorporating a sealed cistern construction with diaphragm means resting on and moving with the surface of the mercury pool. A particular object is to provide diaphragm means consisting of a thin sheet, or alternatively a float and sheet combination. An additional object is to provide a new and improved cistern construction incorporating limits for control of diaphragm movement.

A specific object of the invention is to provide such a mercury system that can be used with sealed cisterns as a level and that can be used with cisterns attached to pressure sources as a manometer.

Other objects, advantages, features and results will more fully appear in the course of the following description. The drawings merely show and the description merely describes preferred embodiments of the present invention which are given by way of illustration or example.

In the drawings:

FIG. 1 is a side view, partly in section, of a mercury system incorporating a preferred embodiment of the bellows unit of the invention;

FIG. 2 is an enlarged sectional view of a portion of a cistern of FIG. 1;

FIG. 3 is a diagram illustrating a typical electrical circuit for the system of FIG. 1;

FIG. 4 is a vertical sectional view of an alternative form for the bellows unit of FIG. 1;

FIG. 5 is a vertical sectional view of another and presently preferred form for the cisterns of FIG. 1; and FIG. 6 is a vertical sectional view of another alternative form for the cisterns of FIG. 1.

The system illustrated in FIGS. 1 and 2 includes a cistern 10, connected by a line 11 to a control unit 12 which in turn is connected by a line 13 to another cistern 14. The cisterns 10 and 14 may be identical and include a housing with a lower member 17, an upper member 18, a cover 19 and a cap 20. The lower member 17 includes a cavity providing a chamber 22 for a pool of mercury, and passages 23, 24 for coupling the chamber 22 to the lines 11 and 13.

A float is positioned within the cistern for resting on the pool of mercury. In the embodiment illustrated, the float comprises metal plates 26, 27 clamped together by screws 28. The float serves as the lower plate of a capacitor within the cistern. In alternative constructions, the float may be made of plastic or other electrical nonconductor, with a conducting layer along the upper surface and with means providing an electrical path between the conducting layer and the mercury pool.

The upper capacitor plate is fixed in the housing above the float and in the embodiment illustrated comprises a metal block 30 mounted on a sleeve 31 and suspended from an insulator disc 32 in a chamber 33 within the upper housing member 18 (FIGS. 1 and 2). An electrical connection is made to the block 30 via a wire 34 mounted in the cover 19 in an insulating bushing 35.

A sleeve 36 is carried on the lower end of the wire 34, with a spring 37 contacting the sleeve 36 and the block 30. This construction permits ready assembly and removal of the cap and cover. A passage 39 around the disc 32 provides for airflow within the interior of the cistern. A passage 40 in the upper housing member 18 provides access to the chamber 33, and may be closed with a plug 41 when desired. A passage 42 provides for introducing mercury into the system and may be closed with a plug 43. Normally only one access passage 42 is utilized. Of course, the access passage 42 is not necessary and the system could be charged through one of the chambers 22.

The float is connected to the cistern by a thin sheet 45 of elastic material, which typically is a synthetic such as a silicone or a butyl rubber. In the embodiment illustrated, the sheet 45 is in the form of an annulus with the outer periphery clamped between the housing members 17, 18 and with the inner edge clamped between the plates 26, 27 forming the float. The float and sheet form a diaphragm dividing the interior of the cistern into an upper air chamber and a lower mercury chamber.

Means may be provided for limiting the upward movement of the float in a cistern and, in the embodiment illustrated, the plate 26 of the float is provided with a sloping upwardly facing edge 46 and the housing member 18 is provided with a sloping downwardly facing shoulder 47. The sheet 45 is designed to serve as a seal for the mercury in the chamber 22 and to provide substantially no restraint on the movement of the float. Engagement of the float edge 46 and the housing shoulder 47 provides a mechanical stop for upward motion of the float and also a seal for the mercury in the event of rupture of the thin sheet. In a typical instrument, the normal gap between the upper surface of the float and the lower surface of the block 30 is about 0.040 inch. In such a unit, the float edge and housing shoulder would be designed to limit the upward movement of the float to about 0.020 inch. These cisterns are ordinarily utilized with very sensitive systems so that the floats normally move only a few thousandths of an inch.

The control unit 12 includes a block 50 for connecting to the lines 11, 13, a bottom plate 51, a shell 52, and a hollow threaded shaft 53 supported by a spider 54 in the neck 55 of the shell 52. A variable volume device, typically a bellows 56, is mounted on the plate 51 within the shell 52. The interior of the bellows 56 is filled with mercury and communicates with the lines 11, 13 through an opening in the plate 51 and a T passage in the block 50. A piston 59 is threadedly mounted on the shaft 53 for movement in the neck 55. An O-ring 60 provides a seal between the piston and the shell. A plug 61 provides a closure for the upper end of the threaded opening in the piston 59.

In operation, the chambers 22, the lines 11 and 13, and the bellows 56 are filled with mercury and the passage 42 is closed by the plug 43. The shell 52 of the control unit 12 is filled with oil or other relatively incompressible fluid and the piston 59 is screwed down on the shaft 53, with the plug 61 removed permitting excess air and oil to flow out of the control unit. The plug 61 is then inserted in the piston.

When the piston 59 is advanced further into the shell of the control unit, the oil applies a compression force on the bellows forcing mercury out of the bellows and into the chambers 22 with the resultant upward movement of the floats. Thus the piston movement provides a means for adjusting the gap between the capacitor plates in each of the cisterns.

A typical electrical circuit is shown in FIG. 3. Capacitors 65, 66 are connected in series across an AC source 67. A potentiometer 68 may also be connected across the source 67 with the arm 69 of the potentiometer providing an adjustment for electrical null. The arm 69 is connected to one output terminal 70, and the junction point 71 between the two capacitors 65, 66 is connected to the other output terminal 72. The junction point 71 is also connected to circuit ground which includes the mercury, the cistern housings and the floats.

The system of FIG. 1 may be utilized as a level by closing the passages 40 with the plugs 41. When the two cisterns are at exactly the same level, the gaps between the plates of each of the capacitors will be the same and the signal at the terminals 70, 72 will be a minimum. If one cistern is raised slightly relative to the other, the gap in one cistern will increase and the gap in the other cistern will decrease, providing a change in signal at the terminals 70, 72. Hence when the output signal is a null, the system indicates that the surface on which the two cisterns are resting is level. Instruments incorporating the system of the invention have been used to provide leveling resolution within 1 millisecond of ARC.

The system of FIG. 1 may also be utilized as a manometer, in the manner indicated in the aforementioned U.S. patents. Pressure sources are connected to each of the passages 40, the vent passages 39 are closed, and one cistern is moved vertically relative to the other to provide a zero or null output signal. Then the difference in elevation between the two cisterns provides a measure of the difference in pressure of the two sources. In a typical instrument, a high vacuum or low pressure is connected to the upper cistern and the lower cistern is connected to the ambient atmosphere to provide a measure of atmospheric pressure.

When the relative pressures applied to the two cisterns is changed rapidly or when one of the cisterns is moved vertically relative to the other rapidly or when one of the cisterns is turned over, there is a strong tendency for the mercury to move into one or the other of the chambers 22. The diaphragms prevent mercury flow into the upper chambers 33. Engagement of the float with the shoulder of the housing prevents overstressing of the diaphragm. Hence no spilling occurs and the valving ordinarily utilized for controlling mercury flow during slewing may be omitted. The diaphragms keep the mercury from contact with air and eliminate problems arising from oxidation of the mercury.

An alternative construction for the control unit 12 is illustrated in FIG. 4. A bottom plate 75 is mounted on the block 50, with a cover 76 being carried on the plate 75. A bellows 77 is mounted on the plate 75 and a second bellows 78 is also mounted on the plate 75 around the bellows 77. The bellows 77 is closed with a cap 79 which is fixed to a cap 80 closing the bellows 78. The interior of the bellows 77 communicates with the mercury lines 11, 13 through a passage in the plate 75 and a T passage in the block 50. The zone between the bellows 77, 78 may be filled with mercury through a passage 81 in the plate 75, which passage is closed by a plug 82. The zone around the bellows 78 is open to the ambient atmosphere through a vent passage 83 in the cover 76.

The control unit of FIG. 4 provides for varying the volume of the bellows 77 to compensate the system for changes in temperature and maintain the gaps between the capacitor plates constant. Mercury expands in volume as its temperature increases. The mercury in the closed zone between the bellows 77, 78 expands with an increase in temperature, raising the plates 79, 80 and thereby expanding the bellows 77 to increase the volume within the bellows 77 providing additional volume for the expansion of the mercury in the cisterns and interconnecting line. By selecting the relative sizes of the bellows 77, 78, the increase in bellows volume with temperature can be made to exactly coincide with the increase in mercury volume and thereby maintain the capacitor gaps in the cisterns constant.

An alternative construction for a cistern is illustrated in FIG. 5, where elements corresponding to those of FIGS. 1 and 2 are identified by the same reference numerals, and where elements serving the same purpose as those of FIGS. 1 and 2 but having slightly changed configuration are identified by the same reference numerals primed.

The float is omitted and the diaphragm comprises a thin sheet 88 clamped between the lower housing member 17' and upper housing member 18' and completely closing the mercury chamber 22. The sheet 88 may be made of the same material as the sheet 45 of FIG. 1. Typically the diaphragm may be in the order of 0.007 inch thick. A very thin film of a soft, pliable metal such as nickel may be vacuum deposited on the diaphragm to leak proof the material if desired.

An insulator sleeve 89 is positioned around the block 30' below the insulator disc 32 with the diaphragm engaging the lower surface of the sleeve 89. The sleeve 89 is made of an electrical insulating material, such as plastic or glass. The sleeve is maintained in place by a snap ring 90 and keys 91, 92. Sleeve 31' is threaded into the block 30' and pulls the block 30' upward against the sleeve 89. Air passages are provided in the sleeve 89 to provide for airflow between the upper surface of the diaphragm 88 and the space above the sleeve 89 and the passage 40. Two or more passages 93 may be utilized, preferably having a plurality of smaller passages 93' at the lower ends to prevent the diaphragm from blowing into the larger passage. Two or more radial passages 94 intersect the passages 93 and connect annular passages 100 and 111, with the passage 40 communicating with the passage 110.

In the cistern of FIG. 5, the lower surfaces of the block 30' serves as one capacitor plate and the upper surface of the mercury pool in the chamber 22 serves as the other capacitor plate. The thin sheet 88 and the air in the gap between the sheet 88 and the block 30 serve as the dielectric of the capacitor. In a typical unit, the sheet 88 will be about five thousandths thick and the airgap between the sheet and the block will be 20 to 40 thousandths. The normal movement of the surface of the mercury pool and hence of the sheet 88 will be in the order of two to four thousandths of an inch.

The sheet 88 provides for total enclosure of the mercury and prevents escape of mercury vapors. The sleeve 89 and the block 30' serve as stops for limiting the upward movement of the sheet 88 to prevent damage to the sheet.

Another alternative form for a cistern is illustrated in FIG. 6 where parts corresponding to those of FIGS. 1 and 2 are identified by the same reference numerals or by numerals double primed.

An insulator disc 95, typically of glass, and the thin sheet 88 are clamped between the housing members 17'', 18''. A recessed portion is provided in the disc 95 to form a chamber 96 and provide an airgap between the sheet 88 and a film 97 of electrical conductive material on the disc 95. The film 97 is centrally located on the disc 95 and serves as the upper capacitor plate, with the surface of the mercury pool serving as the lower capacitor plate. An electrical feed-through connector 98 is fixed in the disc 95 to provide an electrical circuit between the film 97 and lead 99. Vent passages 100 are provided in the disc 95.

The operation of the cistern of FIG. 6 is the same as the cistern of FIG. 5, with the insulator disc 95 carrying the film for the upper capacitor plate and also serving as a limit stop for upward movement of the thin sheet 88 and mercury pool.

Although exemplary embodiments of the invention have been disclosed and discussed, it will be understood that other applications of the invention are possible and that the embodiments, disclosed may be subjected to various changes, modifications and substitutions without necessarily departing from the spirit of the invention. By way of example, while a simple electrical circuit has been illustrated, the more sophisticated electrical circuits used in the present day instruments, including those illustrated in the aforementioned U.S. patents, may be utilized with the mercury system of the invention. Also, the presently known mechanisms for raising and lowering cisterns and the presently known mechanisms for providing and controlling the pressure sources, including those illustrated in the aforementioned patents, may be used with the mercury system illustrated and described herein.

I claim:

1. In a mercury system including first and second cisterns, each cistern including a capacitor with a first capacitor plate positioned above a pool of mercury and a second capacitor plate at the pool of mercury, and a mercury carrying line interconnecting the cisterns,
the improvement wherein each of the cisterns includes diaphragm means affixed at the periphery thereof to the cistern and defining upper and lower chambers,
with the first capacitor plate in the upper chamber and with the lower chamber filled with mercury whereby said diaphragm means engages and is moved by the upper surface of the mercury pool.

2. A system as defined in claim 1 in which said diaphragm means comprises a thin sheet of elastic material, with the surface of the mercury pool serving as the second capacitor plate and with the thin sheet forming a portion of the dielectric.

3. A system as defined in claim 2 in which each of the cisterns includes an insulator supported in the upper chamber, with the first capacitor plate carried below said insulator closely spaced above said thin sheet and located centrally of said thin sheet,
with said insulator including an annular portion disposed about said first capacitor plate and substantially engaging said thin sheet.

4. A system as defined in claim 3 wherein said capacitor is a generally cylindrical structure with a flat bottom, and said insulator includes a separate tubular member disposed about said cylindrical structure.

5. A system as defined in claim 2 in which each of the cisterns includes an insulator supported in the upper chamber and having a substantially flat lower surface with said first capacitor plate affixed thereto in the form of a thin layer.

6. A system as defined in claim 1 in which said diaphragm means comprises:
a float resting on the pool of mercury within the cistern, said float including the second capacitor plate spaced from said first capacitor plate and in electrical contact with the pool of mercury; and
a thin sheet of elastic material affixed at its periphery to the cistern and affixed interiorly of its periphery to said float.

7. A system as defined in claim 6 wherein each of said floats has a sloping upwardly facing outer edge and each of said cistern has a sloping downwardly facing inner shoulder disposed above said thin sheet, with said edge and shoulder engageable for limiting upward movement of the float.

8. A system as defined in claim 6 in which said float comprises an upper plate member and a lower plate member, with said thin sheet clamped between said plate members.

9. A system as defined in claim 1 including a control unit connected to said line between said cisterns,
said control unit comprising a housing with a bellows means therein defining an inner zone and an outer zone,
with one of said zones connected to said line and containing mercury with said the other of said zones containing a fluid for exerting a volume varying force on said bellows means.

10. A system as defined in claim 9 in which said control unit housing includes an opening closed by a piston movable relative to said housing for varying the volume of said other zone.

11. A system as defined in claim 10 in which said piston is threadedly mounted on a hollow shaft providing a small passage between the ambient atmosphere and said other zone, and including means for closing said passage.

12. A system as defined in claim 9 including:
a second bellows means within said control unit housing and about said first bellows means defining an intermediate zone between said inner and outer zones;
means for coupling said bellows means together at each end thereof;
first passage means for introducing a fluid into said intermediate zone; and
second passage means for connecting said other zone to the ambient atmosphere.

13. A system as defined in claim 9 wherein said upper chamber of each of said cisterns is closed to provide a leveling system.

14. A system as defined in claim 9 wherein one of said cisterns is movable vertically relative to the other of said cisterns and said upper chamber of the upper cistern is connectable to a lower pressure source and said upper chamber of the lower cistern is connectable to a higher pressure source to provide a manometer.

* * * * *

PO-1050
(5/69)

UNITED STATES PATENT OFFICE
CERTIFICATE OF CORRECTION

Patent No. 3,645,135                              Dated February 29, 1972

Inventor(s)  Benjamin H. Hadley

It is certified that error appears in the above-identified patent and that said Letters Patent are hereby corrected as shown below:

Column 4: Line 31, "100" should read --110--;
          Line 33, "surfaces" should read --surface--.

Column 6: Line 5, "cistern" should read --cisterns--
          Line 11, after "system" insert --as--;
          Line 16, after "mercury" insert --and--
          Line 16, after "with" delete "said".

Signed and sealed this 26th day of December 1972.

(SEAL)
Attest:

EDWARD M. FLETCHER, JR.                    ROBERT GOTTSCHALK
Attesting Officer                         Commissioner of Patents